United States Patent [19]

Suzuki et al.

[11] Patent Number: 5,117,799
[45] Date of Patent: Jun. 2, 1992

[54] CONTROL SYSTEM FOR A SUPERCHARGED INTERNAL COMBUSTION ENGINE

[75] Inventors: Hitoshi Suzuki, Niiza; Shinji Kamimaru; Shigeru Ando, both of Tokyo, all of Japan

[73] Assignee: Fuji Jukogyo Kabushiki Kaisha, Tokyo, Japan

[21] Appl. No.: 512,647

[22] Filed: Apr. 20, 1990

[30] Foreign Application Priority Data

Apr. 27, 1989 [JP] Japan ................ 1-110874
Sep. 29, 1989 [JP] Japan ................ 1-254757

[51] Int. Cl.⁵ ............................ F02B 39/04
[52] U.S. Cl. ................................ 123/561
[58] Field of Search .............. 123/559.1, 561

[56] References Cited

U.S. PATENT DOCUMENTS

| 4,530,339 | 7/1985 | Oguma et al. ............ 123/561 |
| 4,563,997 | 1/1986 | Aoki ........................ 123/561 X |
| 4,875,454 | 10/1989 | Okimoto et al. ......... 123/561 X |

FOREIGN PATENT DOCUMENTS

| 3414254 | 10/1985 | Fed. Rep. of Germany ...... 123/561 |
| 60-90924 | 5/1985 | Japan . |
| 209627 | 10/1985 | Japan .................... 123/561 |
| 60-209629 | 10/1985 | Japan . |
| 61-93232 | 5/1986 | Japan . |
| 191631 | 8/1987 | Japan .................... 123/561 |
| 1-40821 | 6/1988 | Japan .................... 123/561 |
| 167027 | 7/1988 | Japan .................... 123/561 |
| 53018 | 3/1989 | Japan .................... 123/561 |

*Primary Examiner*—Michael Koczo
*Attorney, Agent, or Firm*—Martin A. Farber

[57] ABSTRACT

A control system for an internal combustion engine having an air pump provided in an intake passage for supplying air into a cylinder of the engine. A continuously variable belt-drive automatic transmitting device is provided between a crankshaft of the engine and a drive shaft of the air pump. The transmitting device control unit is controlled by a control unit in accordance with operating conditions of the engine. A throttle valve is provided upstream of the air pump.

6 Claims, 9 Drawing Sheets

CONTROL SYSTEM FOR A SUPERCHARGED INTERNAL COMBUSTION ENGINE

BACKGROUND OF THE INVENTION

The present invention relates to a control system for an internal combustion engine having an air pump for controlling the engine in accordance with load.

In order to increase output power of the engine, there has been proposed a system in which a mechanical supercharger comprising an air pump is provided upstream or downstream of a throttle valve in an intake passage of the engine.

FIG. 4 shows a conventional system of an engine b having a supercharger a. The supercharger a is provided downstream of a throttle valve f in an intake passage e of the engine.

An air pump of the supercharger a is operatively connected to a crankshaft c of the engine b through an endless belt d running over a crank pulley and a pump pulley. The pump is driven by the crankshaft c at a predetermined step-down or step-up. A bypass h is provided around the supercharger a. The bypass h is provided with a control valve j. A rotating speed sensor g is provided on the supercharger a for detecting the rotating speed of the air pump. When the rotating speed reduces to a predetermined low speed, the sensor g produces a signal to open the control valve j. In a light engine load range, an opening degree of the throttle valve f is reduced and the control valve j is opened for returning discharged air to an inlet of the pump through the valve, thereby reducing the engine speed.

However, in such a light load state, the pumping loss of the engine b becomes large as shown by oblique lines in FIG. 5, particularly, even if the engine works as a pump at idling of the engine, so that fuel consumption increases at idling.

Japanese Patent Application Laid-Open 60-90924 and 60-209629 disclose systems each having an air pump for recovering the pumping loss of the engine.

The system of the former patent application has two pumps connected to the crankshaft of the engine. The output of the engine is controlled by the throttle valve. At light load condition of the engine, one of the pumps is operated in accordance with the pressure difference between the inlet side and the outlet side of the pump. The power generated by the pump is transmitted to the engine. At middle or heavy load condition, the other pump is operated by the engine to supercharge the air to the engine.

Since respective elements operate separately in dependency on engine operating conditions, the system is complicated in operation and construction.

In the system of the latter patent application, a variable delivery air pump is connected to the engine for controlling the power of the engine by varying the discharge of the pump. However, it is difficult to match the discharge of the pump with the opening degree of the throttle valve.

Japanese Patent Application Laid-Open 61-93232 discloses a system in which an air pump provided in the intake passage is driven by an engine through a continuously variable belt-drive automatic transmission.

However, since the intake air quantity passing through the throttle valve is small at light or middle engine load, the work for driving the air pump increases, resulting in a reduction of engine efficiency, although the pumping loss may reduce.

SUMMARY OF THE INVENTION

The object of the present invention is to provide a system in which an air pump is properly operated dependent on load ranges of the engine, thereby providing a high engine efficiency in the entire engine operating range.

According to the present invention, there is provided a control system for an internal combustion engine for a motor vehicle having a crankshaft, an intake passage and an air pump provided in the intake passage for supplying air into a cylinder of the engine. The system comprises a drive shaft connected to the air pump for operating the pump, a transmitting device having an automatic change speed device with an input shaft and an output shaft, the input shaft of the transmitting device being connected to the crankshaft and the output shaft being connected to the drive shaft of the air pump, a throttle valve provided in the intake passage upstream of the air pump, and control unit means for operating the transmitting device in accordance with operating conditions of the engine.

Other objects and features of this invention will become understood from the following description with reference to the accompanying drawings.

DETAILED DESCRIPTION OF THE PREFERRED EMBODIMENTS

Figure 1:
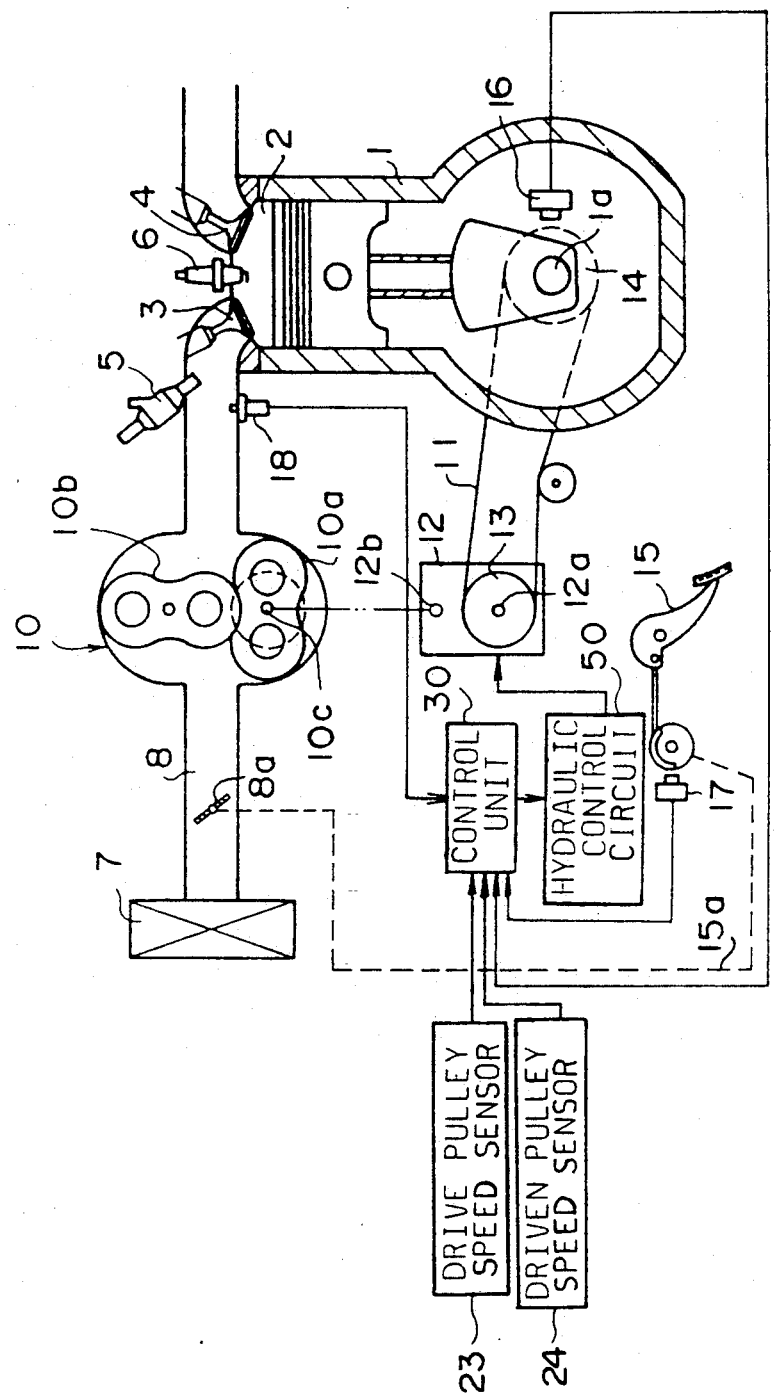
FIG. 1 is a schematic diagram of an internal combustion engine to which the present invention is applied.

Referring to FIG. 1, an automotive engine has a cylinder 1, an intake valve 3, an exhaust valve 4, a fuel injector 5, a spark plug 6, an air cleaner 7, and an intake passage 8. In the intake passage 8 for supplying air to a combustion chamber 2 through the air cleaner 7, an air pump 10 comprising a pair of rotors 10a and 10b is provided downstream of the air cleaner 7, and a throttle valve 8a is provided between the air cleaner 7 and the air pump 10.

The throttle valve 8a is operatively connected to the accelerator pedal 15 through a link unit 15a. An opening degree of the throttle valve 8a is determined responsive to a depressing degree of the accelerator pedal 15.

In an extreme light load condition such as idling of the engine, the opening degree of the throttle valve 8a is set to such a small value that the quantity of air induced by the engine becomes larger than the discharge quantity of the air pump 10. In a load condition higher than the extreme light load condition, the throttle valve 8a is fully opened.

A drive shaft 10c of the rotor 10a of the air pump 10 is connected to an output shaft 12b of a continuously variable belt-drive transmitting device (CVT) 12 having an automatic change speed device. An input pulley 13 secured to an input shaft 12a of the CVT 12 is connected through a transmitting device 11 to a crank pulley 14 secured to a crankshaft 1a of the engine. Rotating speed of the input pulley 13 is transmitted to the drive shaft 10c through the output shaft 12b based on a transmission ratio of the CVT 12. Thus, rotating speed of the air pump 10 is continuously changed in accordance with the transmission ratio of the CVT 12.

Figure 2:
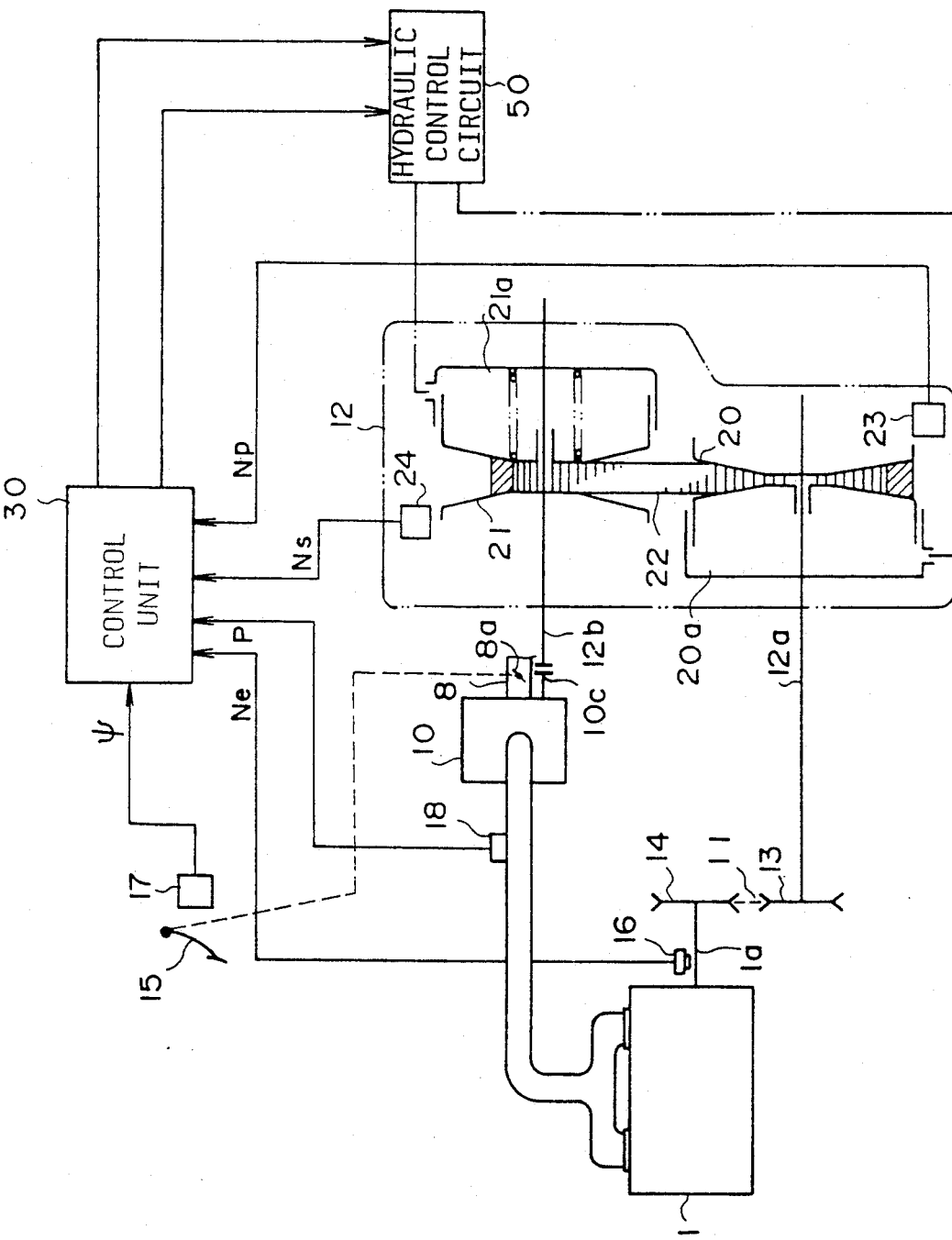
FIG. 2 is a schematic illustration of a control system according to the present invention.

Referring to FIG. 2, the continuously variable belt-drive automatic transmission 12 has the input shaft 12a and the output shaft 12b provided in parallel with the input shaft 12a. A drive pulley (primary pulley) 20 provided with a hydraulic cylinder 20a is mounted on the input shaft 12a. A driven pulley (secondary pulley) 21 provided with a hydraulic cylinder 21a is mounted on the output shaft 12b. A drive belt 22 engages with the drive pulley 20 and the driven pulley 21. Hydraulic cylinders 20a and 21a are communicated with an oil hydraulic control circuit 50. The hydraulic control circuit 50 is responsive to transmitting torque for controlling the amount of oil supplied to the cylinders 20a and 21a. The pulleys 20 and 21 are operated by compressive forces of cylinders so that the running diameter of the belt 22 is varied to continuously change the transmission ratio.

An engine speed sensor 16 is provided adjacent the crankshaft 1a of the engine for detecting engine speed Ne. An accelerator pedal depressing degree sensor 17 is provided adjacent an accelerator pedal 15 for detecting a depressing degree $\Psi$ of the accelerator pedal 15. A pressure sensor 18 is provided on the intake pipe for detecting the pressure of intake air P in the intake passage 8. Rotating speed sensors 23 and 24 are provided near the drive pulley 20 and the driven pulley 21 for respectively sensing rotating speeds Np and Ns of the pulleys 20 and 21.

Output signals of these sensors are applied to an electronic control unit 30 which produces a transmission ratio control signal and a line pressure control signal for the hydraulic control circuit 50.

Figure 3A:
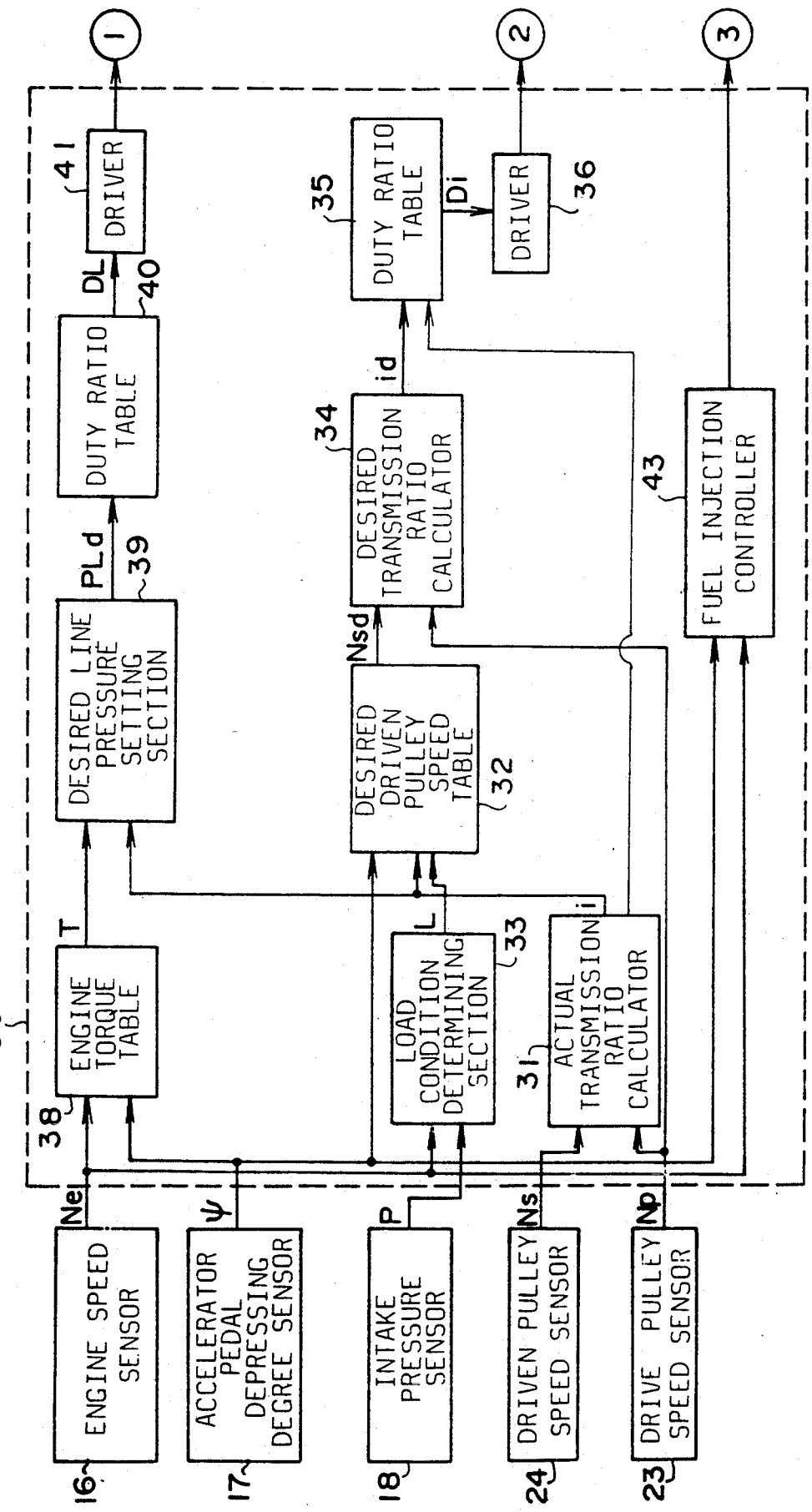
FIGS. 3a and 3b are block diagrams of a control unit of the system.
Figure 3B:
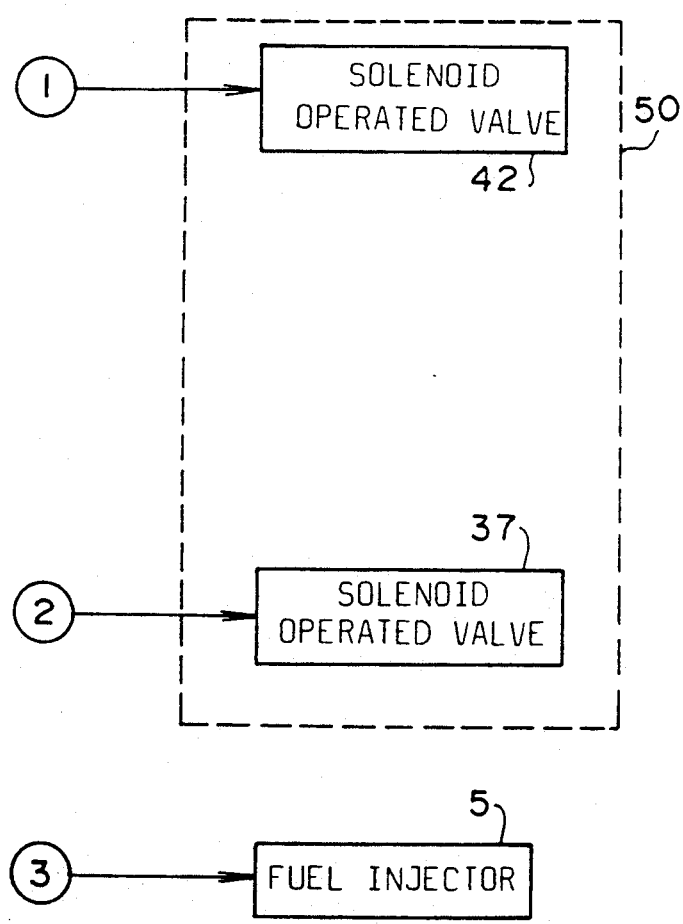
Figure 4:
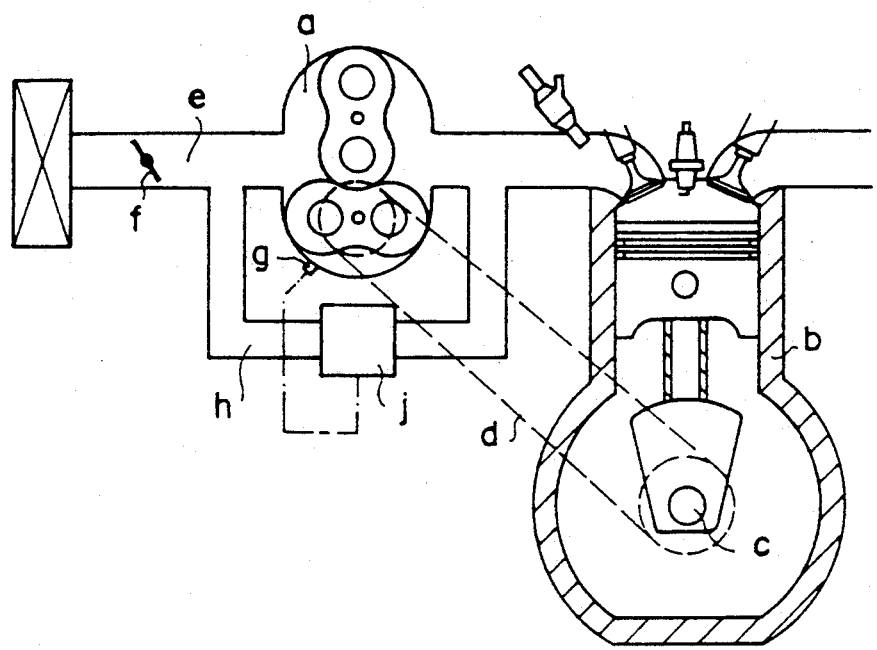
FIG. 4 is a schematic diagram of a conventional engine.
Figure 5:
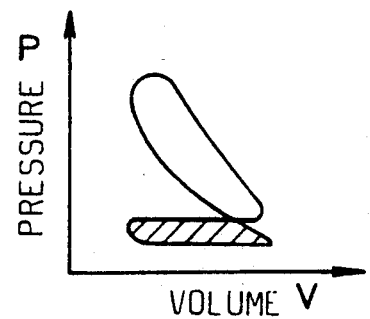
FIG. 5 is an indicator diagram of the conventional engine.

Referring to FIGS. 3a and 3b showing the control unit 30, a system for controlling the transmission ratio for the CVT 12 will now be described. Output signals NP and $N_S$ of the sensor 23 and 24 are fed to an actual transmission ratio calculator 31 to produce an actual transmission ratio i in accordance with $i = N_P/N_S$. The actual transmission ratio i and the output signal $\Psi$ of the accelerator pedal depressing degree sensor 17 are fed to a desired driven pulley speed table 32 to derive a desired driven pulley speed Nsd from the table in accordance with values of the ratio i and the signal $\Psi$. The desired driven pulley speed Nsd represents the rotating speed of the rotor 10a of the air pump 10. The engine speed Ne and the intake pressure P from the sensors 16 and 18 are applied to a load condition determining section 33. The load condition determining section 33 determines a light load condition of the engine and produces a signal L which is applied to the desired driven pulley speed table 32 for controlling the desired driven pulley speed Nsd to an extreme low speed. The desired driven pulley speed Nsd and the drive pulley speed Np are fed to a desired transmission ratio calculator 34 to calculate a desired transmission ratio id in accordance with id = Nsd/Np.

The desired transmission ratio id and the actual transmission ratio i are applied to a duty ratio table 35 to derive a duty ratio Di from the table in accordance with ratios id and i. The duty ratio Di is supplied to a solenoid operated on-off valve 37 through a driver 36. The valve 37 is provided in the hydraulic circuit 50 for shifting a spool of a transmission ratio control valve to control the transmission ratio.

Describing a line pressure control system, the engine speed Ne from the engine speed sensor 16 and the accelerator depressing degree $\Psi$ from the accelerator pedal depressing degree sensor 17 are applied to an engine torque table 38 to derive an engine torque T. The engine torque T and the actual transmission ratio i from the calculator 31 is applied to a desired line pressure providing section 39 to derive a desired line pressure $P_{Ld}$ in accordance with a necessary line pressure corresponding to the actual transmission ratio i multiplied by the engine torque T.

The desired line pressure $P_{Ld}$ is applied to a duty ratio table 40 to derive a duty ratio $D_L$ corresponding to the desired line pressure $P_{Ld}$. The duty ratio $D_L$ is supplied to a driver 41 which operates a solenoid operated on-off valve 42 at the duty ratio.

Further, the control unit 30 is provided with a fuel injection controller 43 to which the engine speed Ne and the accelerator depressing degree $\Psi$ from the sensors 16 and 17 are applied. The controller 43 produces a signal for fuel injection pulse width corresponding to the engine speed Ne and the accelerator depressing degree $\Psi$ for controlling the fuel injector 5.

The operation of the system for controlling the engine will be described hereinafter.

In the extreme light load condition of the engine including idling state, the opening degree of the throttle valve 8a is set to the above-described small degree. Since the intake air quantity of the engine in such a state is larger than the discharge of the air pump 10, the speed of the engine can be controlled by changing the rotating speed of the air pump 10 with the CVT 12. When the accelerator pedal 15 is depressed, the throttle valve 8a is fully opened.

In the light load condition, the driven pulley speed of the CVT 12, namely the rotating speed of the air pump 10 is set to the extreme low speed. Thus, in the intake passage, the pressure at the inlet side of the air pump 10 becomes atmospheric pressure and the pressure of the outlet side of the air pump 10 becomes negative pressure because of suction of the cylinder. The rotors in the air pump 10 are rotated in accordance with the pressure difference accordingly. The torque generated by the air pump 10 is transmitted to the crankshaft 1a through the CVT 12. Consequently, the pumping loss is cancelled by the generated torque so that fuel consumption in a light load range is reduced.

When the accelerator pedal 15 is depressed in a light load condition, fuel corresponding to the engine speed Ne and the accelerator pedal depressing degree $\Psi$ is injected from the fuel injector 5 to the combustion chamber 2. Further, the rotating speed of the output shaft 12b of the CVT 12 is increased in accordance with the desired transmission ratio id corresponding to the depressing degree $\Psi$ of the accelerator pedal 15. The power transmitted to the drive pulley 20 is transmitted to the output shaft 12b by the driving belt 22 and the driven pulley 21 and to the drive shaft 10c of the rotor 10a of the air pump 10. The rotating speed of the air pump 10 is increased to increase the intake air to the cylinder 1.

In a middle or heavy load condition of the engine, the desired line pressure $P_{Ld}$ is set to a high value as the engine torque T becomes large. The duty ratio signal $D_L$ corresponding to the line pressure $P_L$ is applied to the solenoid operated valve 42 to produce the control pressure. The line pressure is controlled in accordance with the averaged control pressure to increase the line pressure $P_L$. When the actual transmission ratio i is reduced to reduce the engine torque T, the line pressure $P_L$ is reduced.

The line pressure $P_L$ is applied to the hydraulic cylinder 21a to hold the belt 22 at a necessary minimum force. Thus, the power is transmitted through the transmission without slipping of the belt. The transmission ratio control valve is operated by the control pressure supplied from the solenoid operated valve 37 to supply or drain oil to or from the cylinder 20a for controlling the transmission ratio of the transmission.

In operation of the transmission ratio control, the signals Np, Ns and $\Psi$ from the sensors 23, 24 and 17 are read. The desired transmission ratio id is calculated in the desired transmission ratio calculator 31. On the other hand, the signals Ne and P from the sensors 16 and 18 are read. In the load condition determining section 33, the light load condition of the engine is determined. If the light load condition is not determined, the desired driven pulley speed Nsd is derived from the desired driven pulley speed table 32 in accordance with the actual ratio i and accelerator depressing degree $\Psi$. The desired transmission ratio id is calculated in the desired transmission ratio calculator 34 based on the desired driven pulley speed Nsd derived from the table 32. If the light load condition is determined in the section 33, the extreme low speed of the desired driven pulley speed Nsd is derived from the table 32.

The transmission ratios i and id are applied to the duty ratio table 35 to derive the duty ratio Di from the table.

The duty ratio signal Di is fed to the solenoid operated valve 37 through the driver 36 for producing the control pressure in the form of pulses which is applied to the transmission ratio control valve for operating the valve between the oil supply position and the oil drain position. When the duty ratio Di becomes small, the transmission ratio control valve is operated to supply the oil to the cylinder 20a. Thus, the transmission is upshifted. When the duty ratio becomes large, the cylinder 20a is drained to downshift the transmission. The change of the duty ratio becomes small and the change of flow rate of oil to the cylinder 20a becomes small, thereby reducing the transmission ratio changing speed. As the difference between the desired ratio id and the actual ratio i becomes large, the change of flow rate of oil to the cylinder 20a becomes large in accordance with a large change of the duty ratio, thereby increasing the transmission ratio changing speed.

The transmission ratio is automatically and continuously varied in the entire operating range of the engine Since the speed of the air pump 10 is continuously changed in response to the depression of the accelerator pedal, the operation of the engine is properly controlled in accordance with the load on the engine.

Figure 6:
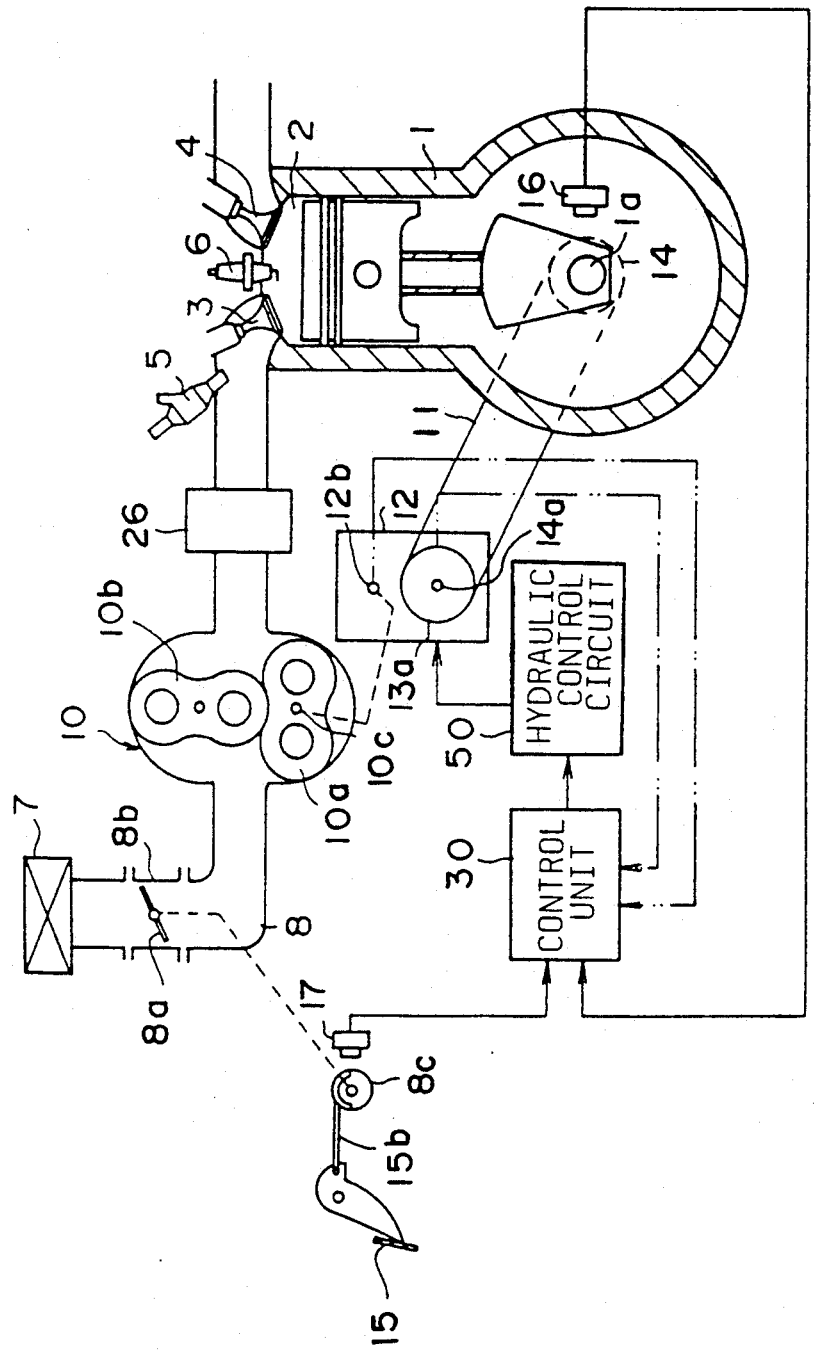
FIG. 6 is a schematic diagram showing another embodiment of the present invention.

Referring to FIG. 6 showing another embodiment of the present invention, the throttle valve 8a is provided in a throttle body 8b provided downstream of the air cleaner 7 and an intercooler 26 is provided downstream of the air pump 10.

Figure 8A:
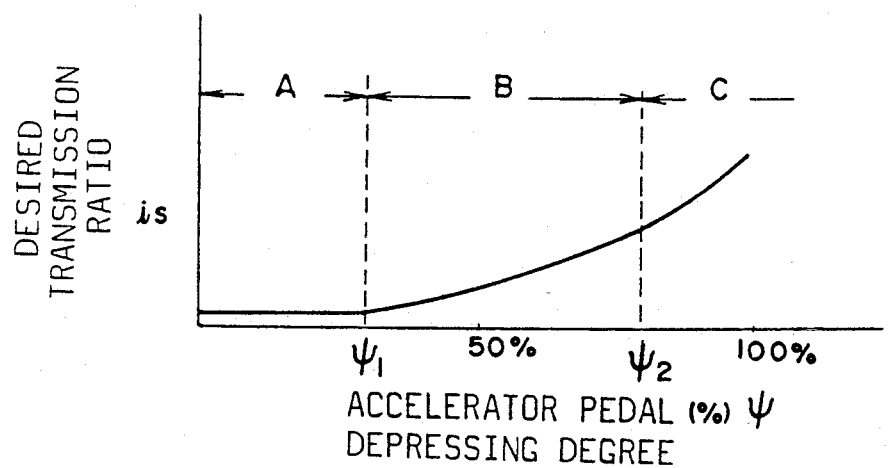
FIG. 8a is a graph showing a characteristic relationship between throttle opening degree and accelerator pedal depressing degree.
Figure 8B:
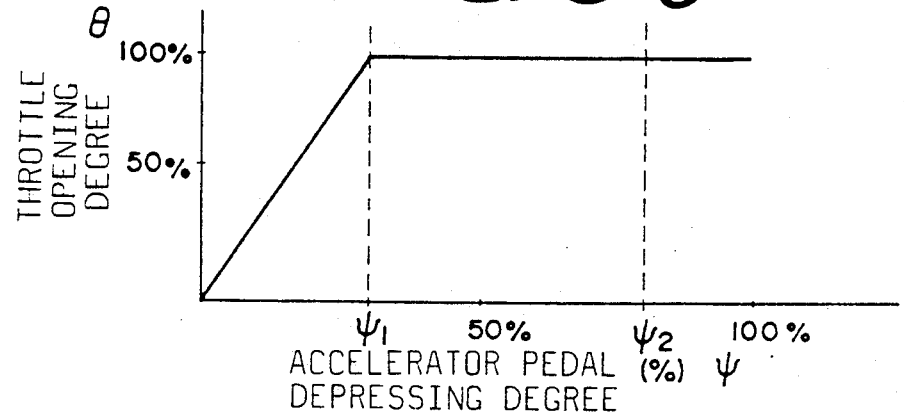
FIG. 8b is a graph showing a characteristic relationship between desired transmission ratio and accelerator pedal depressing degree.

A throttle lever 8c is provided on the throttle valve 8a which is operatively connected to the accelerator pedal 15 through an accelerator wire 15b. As shown in FIGS. 8a, 8b, the opening degree $\Theta$ of the throttle valve 8a is controlled in accordance with the depressing degree $\Psi$ of the accelerator pedal 15. When the accelerator pedal 15 is depressed at depressing degree $\Psi 1$ in an extreme light load range A shown in the graph of FIG. 8b, the throttle opening degree $\Theta$ becomes maximum.

Figure 7A:
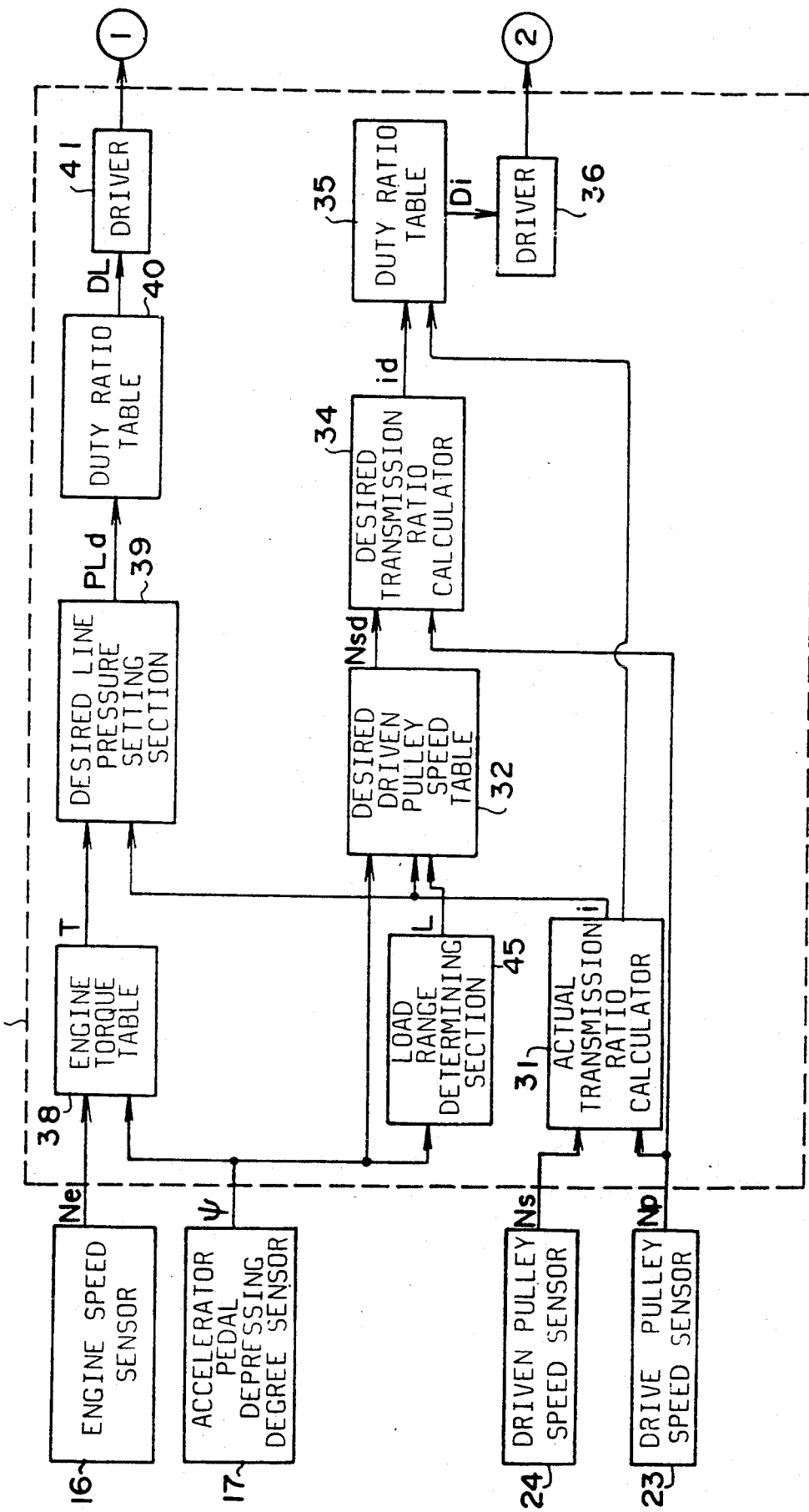
FIGS. 7a and 7b are block diagrams of a control unit of the system of FIG. 6.
Figure 7B:
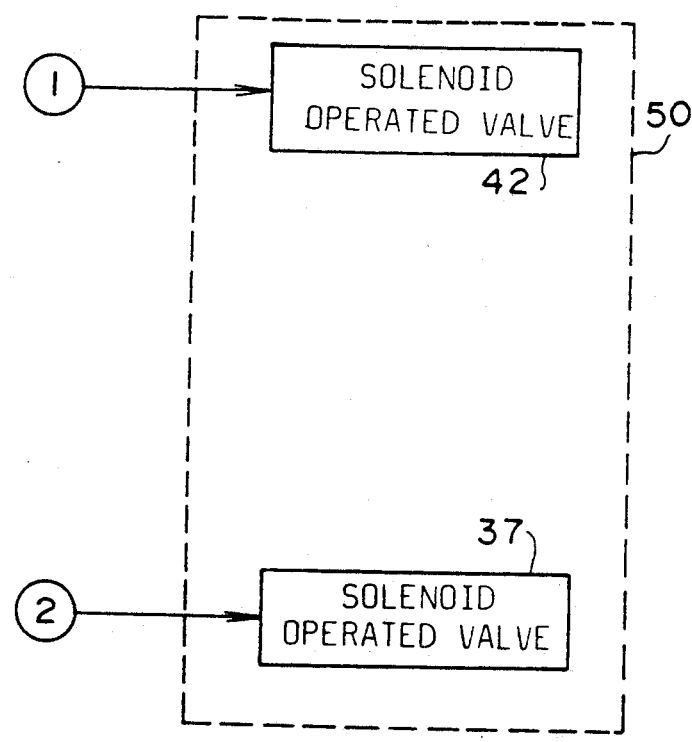

Referring to FIGS. 7a and 7b, the control unit 30 is provided with a load range determining section 45 to which the depressing degree $\Psi$ from the accelerator pedal depressing degree sensor 17 is applied. The load range of the engine such as the extreme light load, the light and middle load, and the heavy load is derived from a look-up table based on the accelerator pedal depressing degree $\Psi$ shown in the graph of FIG. 8b. The load range determining section 45 produces a signal L1 which is applied to the desired driven pulley speed table 32.

The operation of the system will be described hereinafter with reference to FIGS. 8a and 8b. In the extreme light load range A, the desired transmission ratio id of the CVT 12 is small so as to rotate the air pump 10 at a predetermined low speed. The air pump 10 is operated to discharge a predetermined quantity of air. On the other hand, the throttle valve 8a is operated in accordance with the depressing degree $\Psi$ of the accelerator pedal 15.

Figure 9:
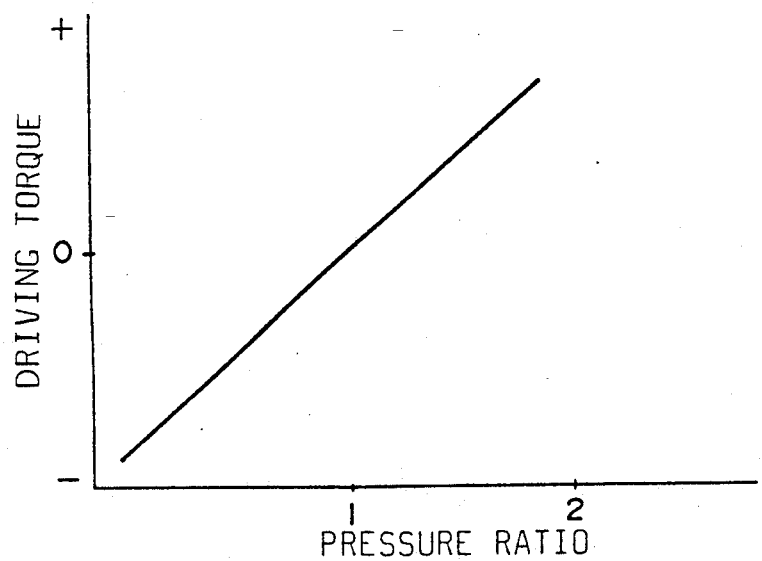
FIG. 9 is a graph showing a characteristic relationship between pressure ratio and driving torque of an air pump.

In light and middle ranges B, the throttle valve 8a is completely opened when the accelerator pedal 15 is depressed at depressing degree ½or more. The transmission ratio i is varied in response to the accelerator pedal depressing degree $\Psi$ for controlling the rotating speed of the air pump 10, and hence the intake air quantity. The pressure ratio between the outlet side and the inlet side of the air pump 10 is less than "1" (outlet side pressure/inlet side pressure). Thus, the work of the air pump 10 becomes negative as shown in the graph of a characteristic between pressure ratio and driving torque of FIG. 9.

In the heavy load range C for supercharging, the rotating speed of the air pump 10 is increased to increase the engine power so as to obtain a necessary supercharging pressure responsive to the depressing degree of the accelerator pedal 15.

In accordance with the present invention, at the heavy engine load, the rotating speed of the air pump 10 is increased to increase the output of the engine, thereby reducing the driving torque of the air pump 10 and preventing knocking of the engine. At the light load condition, the torque of the pump 10 is transmitted to the crankshaft to reduce the pumping loss, thereby improving fuel consumption.

While the presently preferred embodiments of the present invention have been shown and described, it is to be understood that these disclosures are for the purpose of illustration and that various changes and modifications may be made without departing from the scope of the invention as set forth in the appended claims

What is claimed is:

1. A control system for an internal combustion engine for a motor vehicle having a crankshaft, an intake passage and an air pump provided on the intake passage for supplying air into a cylinder of the engine, the system comprising:
   a dive shaft provided on the air pump for operating the pump;
   a transmitting device comprising an automatic change speed device, an input shaft operatively connected to the crankshaft of the engine and an output shaft connected to the drive shaft of the air pump;
   a throttle valve provided in the intake passage at an upstream side of the air pump;
   an accelerator pedal operatively connected to said throttle valve for operating the throttle valve so as to be completely opened when depressing degree of said accelerator pedal is larger than a predetermined angle; and
   means comprising a control unit for controlling the transmitting device in accordance with said depressing degree of said accelerator pedal to change the output of the engine when said accelerator pedal depressing degree is larger than said predetermined angle so as to reduce driving torque of the air pump and to prevent knocking of the engine.

2. The system according to claim 1, wherein the transmitting device is a continuously variable belt-drive transmission.

3. The system according to claim 1, further comprising
   linking means operatively connecting said accelerator pedal to said throttle valve and for gradually opening said throttle valve in dependency on increasing of said depressing degree of said accelerator pedal when the depressing degree of said accelerator pedal is smaller than said predetermined angle.

4. The system according to claim 1, wherein said predetermined angle represents an upper limit of an extreme light load range output by the engine.

5. The system according o claim 1, wherein said means comprising said control unit is further for setting a change speed ratio of said automatic change speed device to a predetermined ratio when said depressing degree of said accelerator pedal is less than said predetermined angle also as to reduce pumping loss at an extreme light load of the engine.

6. The system according to claim 5, wherein said means comprising said control unit is further for setting said change speed ratio small at a low supercharging pressure when said depressing degree of said accelerator pedal is less than said predetermined angle and for changing said change speed ratio and increasing the supercharging pressure as the depression degree of the accelerator pedal increases lager than said predetermined angle.

* * * * *